UNITED STATES PATENT OFFICE.

SPENCER B. NEWBERRY AND HARVEY N. BARRETT, OF BAYBRIDGE, OHIO.

PROCESS OF MAKING FERTILIZER.

1,020,153.     Specification of Letters Patent.     Patented Mar. 12, 1912.

No Drawing.     Application filed March 3, 1909. Serial No. 481,202.

*To all whom it may concern:*

Be it known that we, SPENCER B. NEWBERRY and HARVEY N. BARRETT, citizens of the United States, and residents of Baybridge, in the county of Erie and State of Ohio, have invented certain new and useful Improvements in Processes of Making Fertilizers, of which the following is a specification.

This invention relates to the making of "precipitated" phosphate of lime, consisting essentially of di-calcium phosphate, $CaHPO_4.H_2O$, a product insoluble in water but readily soluble in ammonium citrate solution and available for the nourishment of plants, from natural or artificial forms of insoluble phosphate of lime.

The process hitherto employed for making precipitated phosphate consists in dissolving phosphate rock in hydrochloric acid and adding lime to the solution. The acid and lime used are converted into calcium chlorid, a product of no commercial value, and are therefore lost.

We have discovered a method of treatment by which the consumption of acid in the making of precipitated phosphate may be reduced at least one-half and the addition of lime entirely dispensed with, thus greatly cheapening and simplifying the process. We accomplish this by treating the natural phosphate with sulfuric and hydrochloric acids, by which we obtain a solution of calcium chlorid and mono-calcium phosphate, according to the reaction:

1. $Ca_3(PO_4)_2 + H_2SO_4 + 2HCL = CaSO_4 + CaCl_2 + CaH_4(PO_4)_2$

This solution is filtered from the insoluble residue of the natural phosphate and the calcium sulfate, evaporated to dryness, and the residue gently heated. The mono-calcium phosphate and calcium chlorid react upon each other to form di-calcium phosphate and hydrochloric acid, as follows:

2. $CaCl_2 + CaH_4(PO_4)_2 = 2CaHPO_4 + 2HCl$

The hydrochloric acid evolved on evaporation and heating is condensed in the usual manner and again used in the process. The complete operation, omitting intermediate stages, may therefore be expressed as follows:

3. $Ca_3(PO_4)_2 + H_2SO_4 = CaSO_4 + 2CaHPO_4$ in which the hydrochloric acid used acts merely as a solvent by which the di-calcium phosphate may be separated from insoluble phosphate residue and calcium sulfate and obtained in a comparatively pure condition.

A larger amount of hydrochloric than that indicated in equation 1 may be used without disadvantage for the sake of promoting rapid solution since any excess of hydrochloric acid may be recovered by condensation, except for slight losses. The sulfuric acid may also be added subsequently to the solution in hydrochloric acid, and precipitated calcium sulfate thus obtained, if desired, in a comparatively pure state. The reactions in this case will be the following:

4. $Ca_3(PO_4)_2 + 4HCl = 2CaCl_2 + CaH_4(PO_4)_2$

5. $2CaCl_2 + CaH_4(PO_4)_2 + H_2SO_4 = CaSO_4 + CaCl_2 + CaH_4(PO_4)_2 + 2HCl.$

6. $CaCl_2 + CaH_4(PO_4)_2 + 2HCl = 2CaHPO_4 + 4HCl$

In reaction 4 a solution of calcium chlorid and mono-calcium phosphate is obtained. To this solution enough sulfuric acid is added to precipitate one equivalent of calcium chlorid as sulfate, setting two equivalents of hydrochloric acid free in the solution, and in reaction 6 the mono-calcium phosphate acts on the remaining equivalent of calcium chlorid, setting the remainder of the hydrochloric acid free, as in equation 2. The amount of sulfuric acid used should also be increased by such amount as is required to precipitate as sulfate any lime present as carbonate in the original phosphate.

As a practical example of the working of our process, we take natural phosphate rock, or apatite, consisting chiefly of phosphate of lime, and determine by analysis the percentage of calcium carbonate and of calcium phosphate which it contains. The natural phosphate, in lump form as mined or previously powdered, is then treated with such amount of sulfuric acid as is necessary to convert into sulfate the lime present as carbonate and one-third of the lime present as phosphate in the natural phosphate treated, together with such an amount of hydrochloric acid as is found necessary to bring into solution substantially all the phosphoric acid contained in the natural phosphate. Or, the phosphate is first treated with enough hydrochloric acid to dissolve out substantially all the phosphate contained, and to the solution, filtered from insoluble matter, is added sulfuric acid in approximately the correct amount to precipitate as sulfate all the lime originally present as carbonate and one-third the lime originally present as phosphate. The precipitated calcium sulfate is then filtered out, and owing to its purity may be a valuable by-product.

Whether the sulfuric acid is added at the beginning or subsequently, the solution should contain calcium chlorid and monocalcium phosphate in approximately one equivalent of each, together with more or less excess of hydrochloric acid. This solution is then evaporated to dryness by well-known methods, in pans or revolving cylinders lined with acid-resisting material, and the residue gently heated at a temperature not exceeding 200° C., until evolution of hydrochloric acid has practically ceased. The hydrochloric acid evolved during the evaporation and heating is condensed in the usual manner and used to dissolve a fresh portion of phosphate. The residue may be washed with water to remove any calcium chlorid which it may contain, although if the correct amount of sulfuric acid has been added it should be free from this impurity. It then consists of nearly pure di-calcium phosphate, $CaHPO_4, H_2O$, freely soluble in ammonium citrate solution and available for use as a highly concentrated fertilizer or as an ingredient of commercial fertilizers.

Having thus described our invention what we claim as new and desire to secure by Letters-Patent is:

1. The process of making precipitated phosphate by dissolving natural phosphate of lime in hydrochloric acid with the addition of enough sulfuric acid to convert into sulfate the lime present as carbonate and approximately one-third the lime present as phosphate in the raw material, separating the solution from the insoluble residue, evaporating the solution to dryness, gently heating the residue of precipitated phosphate, and condensing the hydrochloric acid evolved.

2. The process of making precipitated phosphate by dissolving natural phosphate in hydrochloric acid, filtering the solution from the insoluble residue, adding to the solution the amount of sulfuric acid necessary to precipitate as sulfate the lime present as carbonate and approximately one-third the lime present as phosphate in the raw material, filtering the solution from the precipitated sulfate of lime, evaporating the solution to dryness, gently heating the residue of precipitated phosphate, and recovering the hydrochloric acid evolved.

3. The process of making precipitated di-calcium phosphate by treating natural phosphate of lime with substantially enough sulfuric acid to convert into sulfate the lime present as carbonate and one-third the lime present as phosphate in the natural phosphate, separating the di-calcium phosphate formed from insoluble matter by the solvent action of hydrochloric acid, and recovering the di-calcium phosphate and hydrochloric acid by evaporating the solution and gently heating the residue.

In testimony whereof we affix our signatures in presence of two witnesses.

SPENCER B. NEWBERRY.
HARVEY N. BARRETT.

Witnesses:
B. B. BEERY,
ALLEN KUBACH.